US008384704B2

(12) United States Patent
Maki et al.

(10) Patent No.: US 8,384,704 B2
(45) Date of Patent: Feb. 26, 2013

(54) LIQUID CRYSTAL DISPLAY DEVICE

(75) Inventors: Masahiro Maki, Mobara (JP); Katsumi Matsumoto, Mobara (JP); Hideo Sato, Hitachi (JP); Hiroyuki Abe, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 621 days.

(21) Appl. No.: 12/634,733

(22) Filed: Dec. 10, 2009

(65) Prior Publication Data

US 2010/0149156 A1 Jun. 17, 2010

(30) Foreign Application Priority Data

Dec. 11, 2008 (JP) ................................ 2008-316267

(51) Int. Cl.
*G06F 3/038* (2006.01)

(52) U.S. Cl. ......................................... 345/211; 345/87

(58) Field of Classification Search ........................ None
See application file for complete search history.

(56) References Cited

U.S. PATENT DOCUMENTS

| | | | | |
|---|---|---|---|---|
| 8,031,154 | B2 * | 10/2011 | Mamba et al. | 345/96 |
| 8,106,869 | B2 * | 1/2012 | Feng | 345/92 |
| 2005/0253829 | A1 * | 11/2005 | Mamba et al. | 345/204 |
| 2008/0136801 | A1 * | 6/2008 | Shie | 345/204 |
| 2008/0316156 | A1 * | 12/2008 | Shigaki et al. | 345/87 |

FOREIGN PATENT DOCUMENTS

JP 2006-276541 10/2006

* cited by examiner

*Primary Examiner* — Jason Olson
(74) *Attorney, Agent, or Firm* — Antonelli, Terry, Stout & Kraus, LLP.

(57) ABSTRACT

A liquid crystal display device which can reduce a scale of the whole counter-electrode-signal drive circuits is provided. The liquid crystal display device includes: a substrate; a plurality of counter electrodes which are formed on the substrate corresponding to pixels; a plurality of counter electrode signal lines which are formed on the substrate, are electrically made conductive with the counter electrodes, extend in the X direction, and are arranged parallel to each other in the Y direction which intersects the X direction; and counter electrode signal drive circuits having control signal outputting parts which are mounted on the substrate at a rate of one control signal outputting part for two counter electrode signal lines.

9 Claims, 10 Drawing Sheets

LIQUID CRYSTAL DISPLAY DEVICE

CROSS-REFERENCE TO RELATED APPLICATION

The present application claims priority from Japanese application JP 2008-316267 filed on Dec. 11, 2008, the content of which is hereby incorporated by reference into this application.

BACKGROUND OF THE INVENTION

1. Field of the Invention

The present invention relates to a liquid crystal display device, and more particularly to a liquid crystal display device in which a drive circuit is formed on a liquid crystal substrate.

2. Background Art

An active-matrix-type liquid crystal display device has been popularly used as a monitor of a personal computer, a television receiver set, an information display device of portable equipment or the like. The liquid crystal display device has the structure where a liquid crystal layer is sandwiched between a pair of substrates made of glass or the like on which pixel electrodes and counter electrodes are formed. By applying a voltage between the pixel electrodes and counter electrodes, the alignment direction of liquid crystal is changed. In this manner, by allowing the pixel electrodes and the counter electrodes to function as optical switching elements, an image is formed.

When the liquid crystal layer receives the application of the same voltage for a long time, the alignment direction of liquid crystal is fixed so that so-called burning occurs in the liquid crystal display device. To avoid this burning, in the liquid crystal display device, it is necessary to invert positive and negative polarities of a voltage applied to the liquid crystal layer for every fixed time, typically for every frame. Here, not only by alternately changing a voltage applied to the pixel electrode between two potentials consisting of a high potential and a low potential but also by alternately changing a voltage applied to the counter electrode between two potentials consisting of a high potential and a low potential, it is possible to decrease a width of the voltage applied to the pixel electrode thus reducing the power consumption.

As a method for changing a voltage applied to the counter electrode, several methods have been known. As such methods, a frame inversion method where voltages applied to all counter electrodes are set to the same potential, and the potential is changed for every frame, a line inversion method where a voltage having the same potential is applied to counter electrodes along a row (line) of pixels, and a voltage to be applied to the counter electrodes is changed for every row, a column inversion method where a voltage having the same potential is applied to counter electrodes along a column of pixels, and voltages to be applied to counter electrodes are changed for every column, a dot inversion method where voltages applied to counter electrodes of neighboring pixels are changed and the like are named. Among these methods, a line inversion method is superior to other methods in view of quality of an image display and easiness in forming a drive circuit.

JP-A-2006-276541 discloses a liquid crystal display device adopting a line inversion method where a counter electrode signal drive circuit is provided for every counter electrode signal.

SUMMARY OF THE INVENTION

In the liquid crystal display device disclosed in JP-A-2006-276541, the counter electrode signal drive circuit is provided for every counter electrode signal line and hence, a scale of the whole counter electrode signal drive circuits becomes large. In general, it is desirable to set the scale of the counter electrode signal drive circuits as small as possible. However, particularly with respect to a so-called system-on-glass liquid crystal display device which mounts drive circuits per se on a liquid crystal substrate, when the scale of the drive circuits becomes large, an area which the circuits occupy on the substrate is increased. This increase of the circuit occupying area narrows a picture frame of the liquid crystal display device or hampers the miniaturization of the liquid crystal display device.

The present invention has been made in view of such circumstances, and it is an object of the present invention to reduce a scale of the whole counter electrode signal drive circuits.

To briefly explain the summary of typical inventions among inventions described in this specification, they are as follows.

A liquid crystal display device includes: a substrate; a plurality of counter electrodes which are formed on the substrate corresponding to pixels; a plurality of counter electrode signal lines which are formed on the substrate, are electrically made conductive with the counter electrodes, extend in the X direction, and are arranged parallel to each other in the Y direction which intersects the X direction; control signal outputting parts which are mounted on the substrate at a rate of one control signal outputting part for two counter electrode signal lines; and counter electrode signal drive circuits which receive control signals which the control signal outputting parts output and output voltages applied to the counter electrode signal lines.

In the above-mentioned liquid crystal display device, a first voltage value is outputted to a first counter electrode signal line at a timing that a first control signal is outputted from the control signal outputting part, and a second voltage value is outputted to the first counter electrode signal line in response to a second control signal from the control signal outputting part, while the second voltage value is outputted to a second counter electrode signal line in response to the first control signal from the control signal outputting part and the first voltage value is outputted to the second counter electrode signal line in response to the second control signal from the control signal outputting part.

In the above-mentioned liquid crystal display device, the first counter electrode signal line is connected to a first voltage line via a first transistor and is connected to a second voltage line via a second transistor, the second counter electrode signal line is connected to the first voltage line via a third transistor and is connected to the second voltage line via a fourth transistor, a first output signal line which extends from the control signal outputting part is connected to the first transistor and the fourth transistor, and a second output signal line which extends from the control signal outputting part is connected to the second transistor and the third transistor.

In the above-mentioned liquid crystal display device, the liquid crystal display device includes a switch which changes over an operation mode between a first mode in which the second voltage value is outputted to the second counter electrode signal line in response to the first control signal from the control signal outputting part and the first voltage value is outputted to the second counter electrode signal line in response to the second control signal from the control signal outputting part, and a second mode in which the first voltage value is outputted to the second counter electrode signal line in response to the first control signal from the control signal outputting part and the second voltage value is outputted to the second counter electrode signal line in response to the second control signal from the control signal outputting part.

In the above-mentioned liquid crystal display device, the counter electrode signal drive circuit outputs a control signal in response to a scanning signal inputted from a scanning signal line.

In the above-mentioned liquid crystal display device, the counter electrode signal drive circuit further outputs the control signal in response to a clock signal inputted from a clock signal line.

According to the present inventions described above, it is possible to reduce a scale of the whole counter electrode signal drive circuits.

DETAIL DESCRIPTION OF THE EMBODIMENTS

Hereinafter, a first preferred embodiment of the present invention is explained in conjunction with FIG. 1 to FIG. 8.

Figure 1:
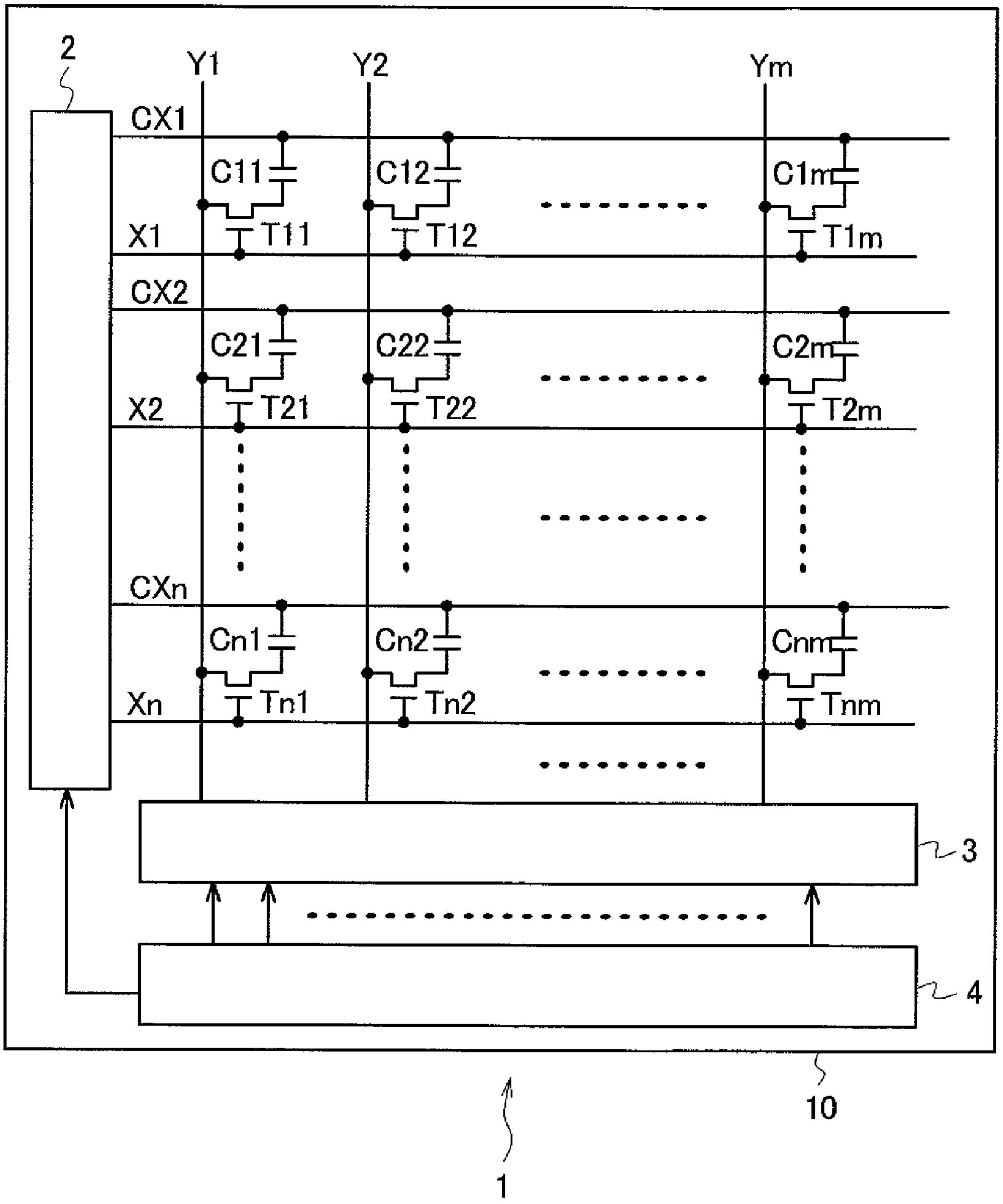
FIG. 1 is an overall circuit diagram showing a circuit arrangement of a liquid crystal display device according to a first embodiment.

FIG. 1 is an overall circuit diagram showing a circuit arrangement of a liquid crystal display device 1 according to this embodiment. The liquid crystal display device 1 according to this embodiment includes n×m pieces of pixels (n pieces of pixels in the longitudinal direction and m pieces of pixels in the lateral direction). A circuit shown in FIG. 1 is formed on a TFT substrate 10 which is constituted of a transparent substrate made of glass or the like. N pieces of counter electrode signal line portions CX1 to CXn which extend in the lateral direction from a vertical drive circuit 2, and n pieces of scanning signal lines X1 to Xn which also extend in the lateral direction from the vertical drive circuit 2 are arranged parallel to each other in the vertical direction as shown in the drawing. On the other hand, m pieces of video signal lines Y1 to Ym which extend in the longitudinal direction from a distribution circuit 3 are arranged parallel to each other in the lateral direction as shown in the drawing. Regions which are surrounded by the scanning signal lines X1 to Xn and the video signal lines Y1 to Ym constitute pixels, and a holding capacitance C11, C12, . . . Cnm which is generated by a pixel electrode and a counter electrode portion is formed in each pixel. Further, a transistor T11, T12, . . . Tnm is formed in each pixel. Each transistor T11, T12, . . . Tnm has a source thereof connected to the pixel electrode, a drain thereof connected to the video signal line Y1, Y2, . . . Ym, and a gate thereof connected to the scanning signal line X1, X2, . . . Xn. The respective counter electrode portions are electrically made conductive with the counter electrode signal line portions CX1 to CXn. Here, the connection of each of the transistors T11, T12, . . . Tnm with the pixel electrode and the video signal line Y1, Y2, . . . Ym may be exchanged. The vertical drive circuit 2 and the distribution circuit 3 are connected to a driver circuit 4. The driver circuit 4 outputs various kinds of control signals to the vertical drive circuit 2, and outputs video signals to the distribution circuit 3.

In the liquid crystal display device 1 having such a constitution, the scanning in the longitudinal direction is performed in response to scanning signals which are outputted to the scanning signal lines X1 to Xn from the vertical drive circuit 2. That is, when a voltage having a high potential is applied to the scanning signal line of a particular column, for example, the scanning signal line X1 and a voltage having a low potential is applied to remaining scanning signal lines X2 to Xn, the transistors T11 to T1$m$ which are connected to the scanning signal line X1 are turned on. Here, a voltage corresponding to a video signal which is outputted to the video signal lines Y1 to Ym from the distribution circuit 3 is written in the holding capacitances C11 to C1$m$. Subsequently, when a voltage having a high potential is applied to the scanning signal line X2 and a voltage having a low potential is applied to the remaining scanning signal lines X1, X3 to Xn, a voltage corresponding to the video signal is written in the holding capacitances C21 to C2$m$. By repeating the above-mentioned operation in the same manner hereinafter, a voltage corresponding to the video signal is written in all holding capacitances C11 to Cnm. The alignment direction of a liquid crystal layer is changed in response to such voltages so that optical transmissivity of liquid crystal is controlled thus forming an image.

In the liquid crystal display device 1 of this embodiment, both the pixel electrodes and the counter electrode portions are formed on the TFT substrate 10. This is because the liquid crystal display device 1 adopts a lateral-electric field driving method which is referred to as an IPS (In-Plane Switching) method. In a vertical-electric-field type liquid crystal display device such as a VA (Vertical Alignment) type or a TN (Twisted Nematic) type liquid crystal display device, as described later, pixel electrodes are formed on a TFT substrate 10 and counter electrode portions are formed on a color filter substrate which faces the TFT substrate 10 in an opposed manner with a liquid crystal layer sandwiched therebetween.

Figure 2:
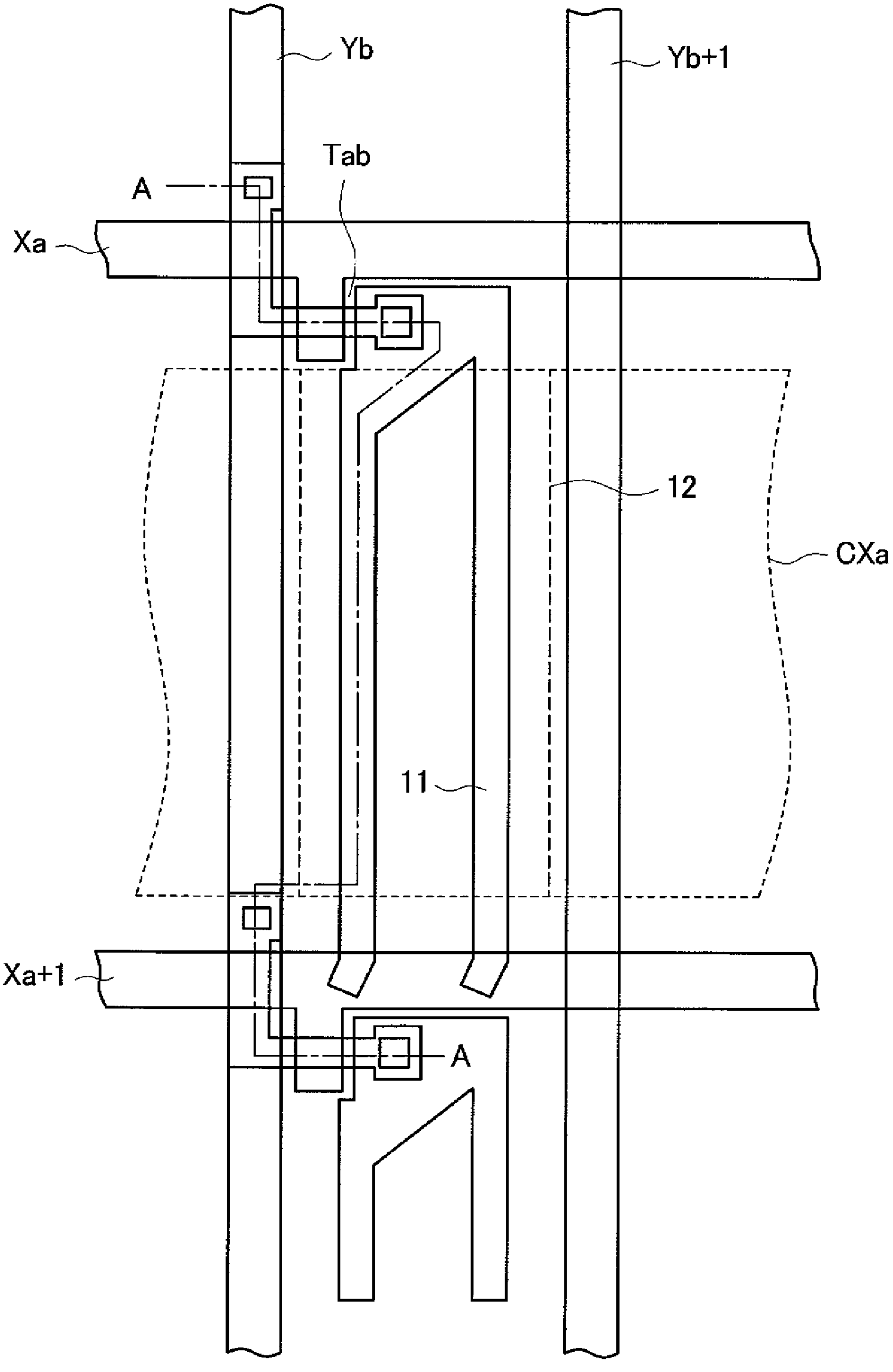
FIG. 2 is an enlarged view of a pixel portion of the liquid crystal display device according to the first embodiment.
Figure 3:
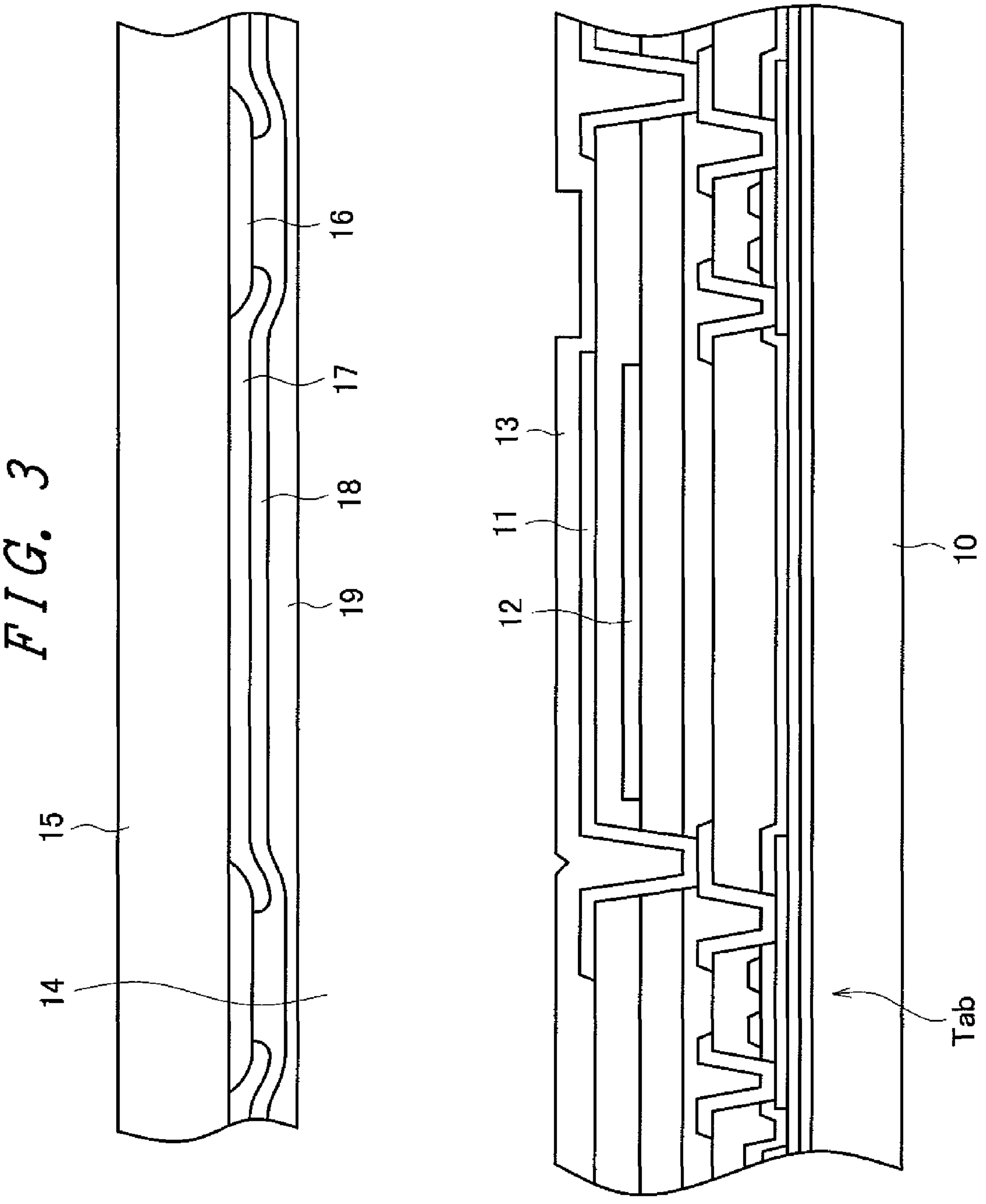
FIG. 3 is a cross-sectional view taken along a line A-A in FIG. 2.

FIG. 2 is an enlarged view of a pixel portion of the liquid crystal display device 1 according to this embodiment, and FIG. 3 is a cross-sectional view of the pixel portion taken along a line A-A in FIG. 2. In FIG. 2 and FIG. 3, although the pixel which is counted as an a-th pixel in the longitudinal direction and is counted as a b-th pixel in the lateral direction is shown, other pixels also have the substantially same constitution.

As shown in FIG. 2, the scanning signal lines Xa, Xa+1 and the video signal lines Yb, Yb+1 are formed on the TFT substrate 10, and the region surrounded by these lines constitutes the pixel. The transistor Tab is formed in the vicinity of an intersection of the scanning signal line Xa and the video signal line Yb. In this embodiment, the transistor Tab is an nMOS-type thin film transistor. A comb-teeth-shaped pixel electrode 11 is connected to the source of the transistor Tab. The counter electrode signal line portion CXa which is indicated by a dotted line is arranged below the pixel electrode 11. Out of the counter electrode signal line portion CXa, a region which is positioned within the pixel indicated by a chained line constitutes the counter electrode portion 12 which functions as a counter electrode of this pixel. That is, a plurality of counter electrode portions 12 are provided for respective pixels and the counter electrode signal line portions CXa is electrically made conductive with these plurality of counter electrode portions 12. Here, it may be possible to provide the structure where the counter electrode portion 12 is formed for every pixel as an independent counter electrode, the counter electrode signal line portion CXa is formed as a counter electrode signal line having a narrow width substantially equal to a width of the scanning signal line Xa, and the counter electrode signal line and the counter electrode may be additionally connected to each other.

In FIG. 3, the transistor Tab, the pixel electrode 11, the counter electrode portion 12, and an alignment film 13 which are formed on the TFT substrate 10 are shown, and an insulation film is suitably formed between the respective components. Further, the color filter substrate 15 is arranged on the TFT substrate 10 with the liquid crystal layer 14 sandwiched therebetween. A black matrix 16, a color filter layer 17, a leveling film 18 and an alignment film 19 are formed on the color filter substrate 15. Here, the leveling film 18 may be omitted if unnecessary.

Figure 4:
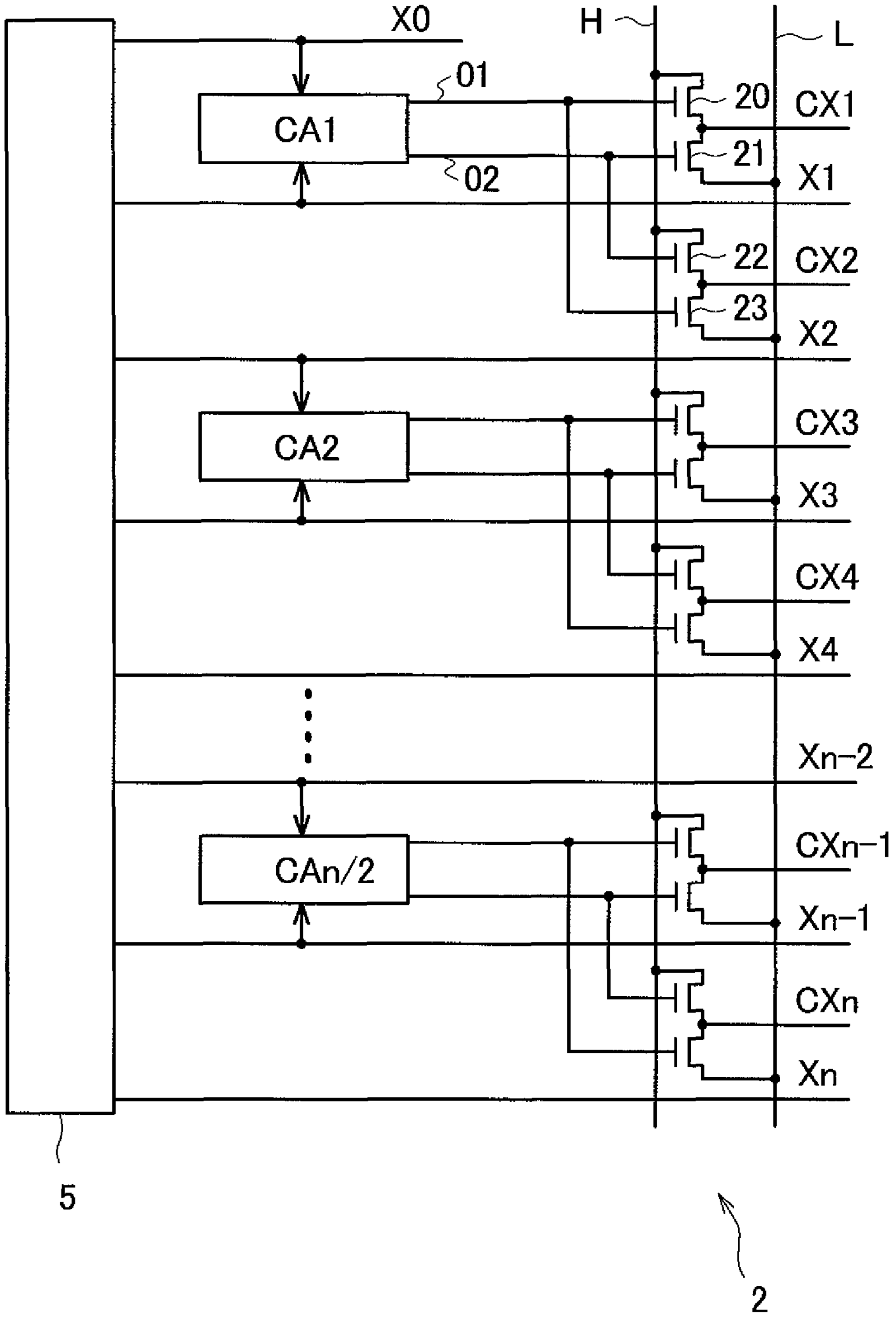
FIG. 4 is a circuit diagram showing the structure of a vertical drive circuit.

FIG. 4 is a circuit diagram showing the structure of the vertical drive circuit 2. The vertical drive circuit 2 includes connection portions which connect the scanning signal drive circuit 5 and the counter electrode signal drive circuits CA1 to CAn/2, and connection portions which connect the counter electrode signal drive circuits CA1 to CAn/2 and the counter electrode signal line portions CX1 to CXn.

The scanning signal drive circuit 5 is connected to the scanning signal lines X1 to Xn, and applies a voltage having a high potential to the respective scanning signal lines from the scanning signal line X1 to the scanning signal line Xn sequentially as described later (hereinafter, referred to as "output a High signal"). The scanning signal lines X1 to Xn to which the High signal is not outputted are held at a voltage having a low potential (hereinafter, referred to as "output a Low signal"). Here, a signal equal to the signal which is outputted to the scanning signal line Xn is outputted to the scanning signal line X0.

As shown in the drawing, the counter electrode signal drive circuits CA1 to CAn/2 are provided such that one counter electrode signal drive circuit out of the counter electrode signal drive circuits CA1 to CAn/2 is connected to two counter electrode signal line portions out of the counter electrode signal line portions CX1 to CXn. For example, the counter electrode signal drive circuit CA1 is connected to the counter electrode signal line portions CX1, CX2, and the counter electrode signal drive circuit CA2 is connected to the counter electrode signal line portions CX3, CX4. Further, to the a-th counter electrode signal drive circuit CAa, a signal from the preceding scanning signal line Xa−1 by one and a signal from the scanning signal line Xa are inputted. To explain this operation by taking the counter electrode signal drive circuit CA1 as an example, the counter electrode signal drive circuit CA1 is connected to the scanning signal lines X0, X1. Further, from the counter electrode signal drive circuit CA1, a first output signal line O1 and a second output signal line O2 extend, and a High signal or a Low signal is outputted in response to the signals from the scanning signal lines X0, X1. The first output signal line O1 and the second output signal line O2 are configured not to output a High signal and a Low signal simultaneously. A signal outputted via the first output signal line O1 and a signal outputted via the second output signal line O2 are control signals for controlling voltages which are applied to the counter electrode signal line portions CX1 to CXn.

In the connection portion, a high-potential voltage supply line H to which a high-potential voltage to be supplied to the counter electrode portions 12 is applied and a low-potential voltage supply line L to which a low-potential voltage to be supplied to the counter electrode portions 12 is applied are arranged. The counter electrode signal line portion CX1 is connected to the high-potential voltage supply line H via a first transistor 20 and is connected to the low-potential voltage supply line L via a second transistor 21. Further, the counter electrode signal line portion CX2 is connected to the high-potential voltage supply line H via a third transistor 22 and is connected to the low-potential voltage supply line L via a fourth transistor 23. Further, the first output signal line O1 is connected to a gate of the first transistor 20 and a gate of the fourth transistor 23, and the second output signal line O2 is connected to a gate of the second transistor 21 and a gate of the third transistor 22.

Here, when a first control signal is outputted from the counter electrode signal drive circuit CA1 such that a High signal is outputted to the first output signal line O1 and a Low signal is outputted to the second output signal line O2, the first transistor 20 and the fourth transistor 23 are turned on, and the second transistor 21 and the third transistor 22 are turned off. As a result, a high-potential voltage is supplied to the counter electrode signal line portion CX1 from the high-potential voltage supply line H, and a low-potential voltage is supplied to the counter electrode signal line portion CX2 from the low-potential voltage supply line L. On the other hand, when a second control signal for allowing the counter electrode signal drive circuit CA1 to output a Low signal to the first output signal line O1 and to output a High signal to the second output signal line O2 is outputted, the first transistor 20 and the fourth transistor 23 are turned off, and the second transistor 21 and the third transistor 22 are turned on. As a result, a low-potential voltage is supplied to the counter electrode signal line portion CX1 from the low-potential voltage supply line L, and a high-potential voltage is supplied to the counter electrode signal line portion CX2 from the high-potential voltage supply line H. That is, due to such a circuit, voltage values outputted to the neighboring counter electrode signal line portions CX1, CX2 respectively are always different front each other thus realizing a line inversion method.

Further, it is sufficient to provide only one counter electrode signal drive circuit CA1, CA2, . . . , CAn/2 for two counter electrode signal line portion CX1, CX2, . . . , CXn and hence, a circuit scale of the whole counter electrode signal drive circuit can be approximately halved compared to a case where one counter electrode signal drive circuit CA1, CA2, . . . , CAn/2 is provided for one counter electrode signal line portion CX1, CX2, . . . , CXn leading to the reduction of the circuit scale.

Figure 5:
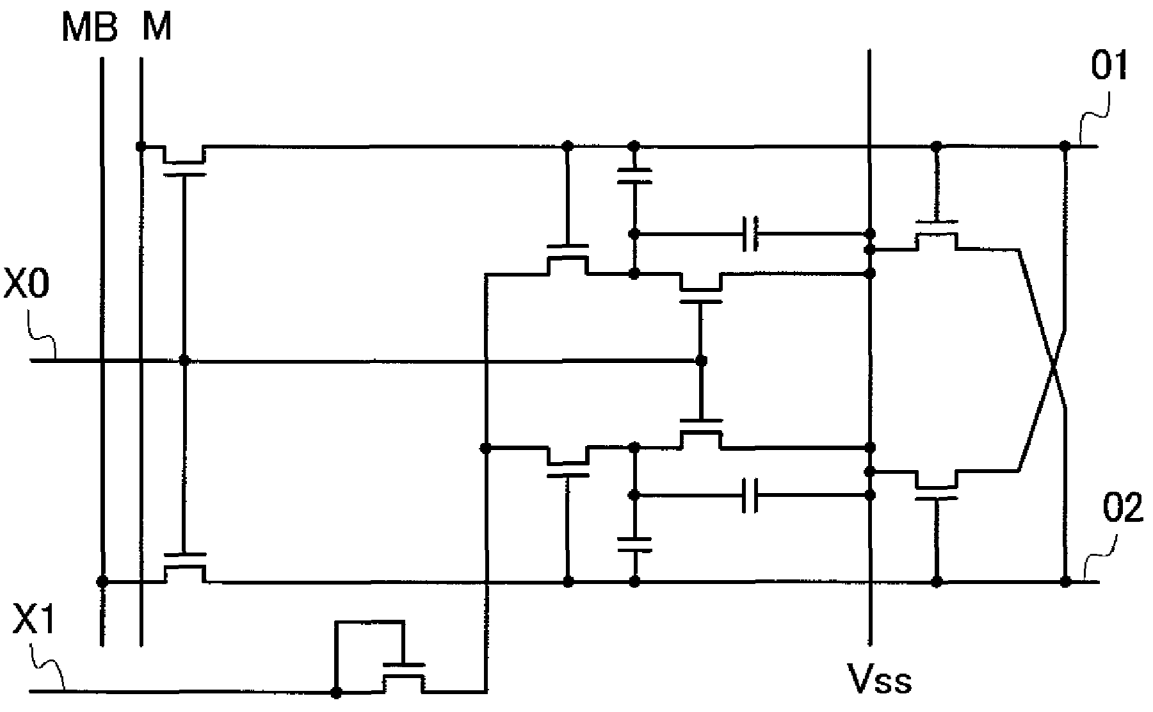
FIG. 5 is a circuit diagram showing the constitution of a counter electrode signal drive circuit.

FIG. 5 is a circuit diagram showing the constitution of the counter electrode signal drive circuit CA1. In the drawing, symbols M and MB indicate AC signal lines, and symbol Vss indicates a reference voltage line. Other counter electrode signal drive circuits CA2 to CAn/2 also have the substantially same constitution. The detailed manner of operation of the respective elements in the circuit shown in FIG. 5 is disclosed in the above-mentioned patent document 1 and hence, in this specification, their detailed explanation is omitted.

Figure 6:
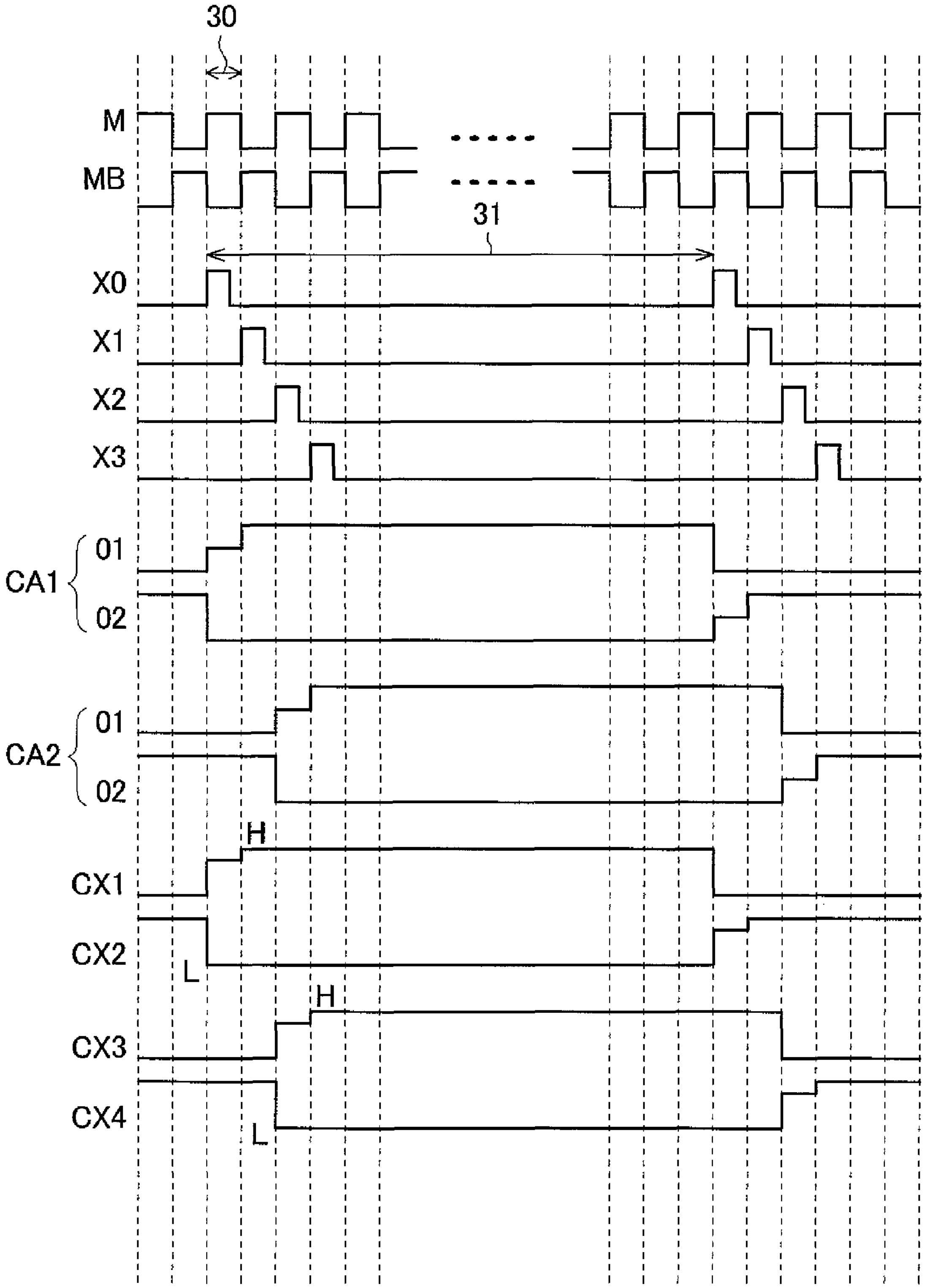
FIG. 6 is a timing chart for explaining an operation of the counter electrode signal drive circuit.

Next, the manner of operation of the counter electrode signal drive circuits CA1 to CAn/2 is explained in conjunction with a timing chart shown in FIG. 6. Although the explanation is made by taking the counter electrode signal drive circuits CA1 and CA2 and the counter electrode signal line portions CX1 to CX4 as an example, the same goes for the remaining counter electrode signal drive circuits CA3 to CAn/2 and the counter electrode signal line portions CX5 to CXn.

Rectangular-wave signals which function as operation clock signal are applied to the AC signal lines M, MB, and the rectangular-wave signals are switched between a high potential and a low potential for every 1 clock. The rectangular wave signals having opposite characteristics are applied to the AC signal line M and the AC signal line MB respectively, and these rectangular-wave signals are configured not to take the same potential simultaneously. Here, in the drawing, an interval indicated by numeral 30 corresponds to 1 clock.

With respect to the scanning signal lines X0 to X4, as shown in the drawing, a pulse-wave signal is applied to the neighboring scanning signal line for every 1 clock. An interval indicated by numeral 31 in the drawing corresponds to 1 frame. When 1 frame elapses, a pulse-wave signal is applied to the same scanning signal line again and, thereafter, the same operation is repeated.

When a High signal is inputted to the scanning signal line X0, the counter electrode signal drive circuit CA1 increases a voltage to be applied to the first output signal line O1 and drops a voltage to be applied to the second output signal line O2 to a low potential. As a result, a voltage which is applied to the counter electrode signal line portion CX1 is increased, and a voltage which is applied to the counter electrode signal line portion CX2 is dropped to a low potential substantially equal to a potential of the low-potential voltage supply line L. Subsequently, when a High signal is inputted to the scanning signal line X1, the voltage which is applied to the first output signal line O1 is further boosted. As a result, the voltage which is applied to the counter electrode signal line portion CX1 is increased to a high potential substantially equal to a potential of the high-potential voltage supply line H.

Further, when a. High signal is inputted to the scanning signal line X2, a voltage of the counter electrode signal drive circuit CA2 which is applied to the first output signal line O1 is increased, and a voltage of the counter electrode signal drive circuit CA2 which is applied to the counter electrode signal line portion CX3 is increased and, at the same time, voltages which are applied to the second output signal line O2 and the counter electrode signal line portion CX4 are dropped to a low potential respectively. Subsequently, when a High signal is inputted to the scanning signal line X3, voltages which are applied to the first output signal line O1 and the counter electrode signal line portion CX3 are boosted respectively. Thereafter, the similar operation is repeated up to the counter electrode signal drive circuits CAn/2 and the counter electrode signal line portion CXn.

When 1 frame elapses and a High signal is inputted to the scanning signal line X0 again, this time, a voltage of the counter electrode signal drive circuit CA1 which is applied to the first output signal line O1 is dropped to a low potential, and a voltage of the counter electrode signal drive circuit CA1 which is applied to the second output signal line O2 is increased. That is, in this frame, the voltage applied to the first output signal line O1 and the voltage applied to the second output signal line O2 are inverted from each other with respect to the preceding frame. As a result, a voltage applied to the counter electrode signal line portion CX1 and a voltage applied to the counter electrode signal line portion CX2 are also inverted from each other. In this manner, the voltages which are applied to the counter electrode signal line portions CX1, CX2, . . . , CXn are changed for every frame.

Figure 7:
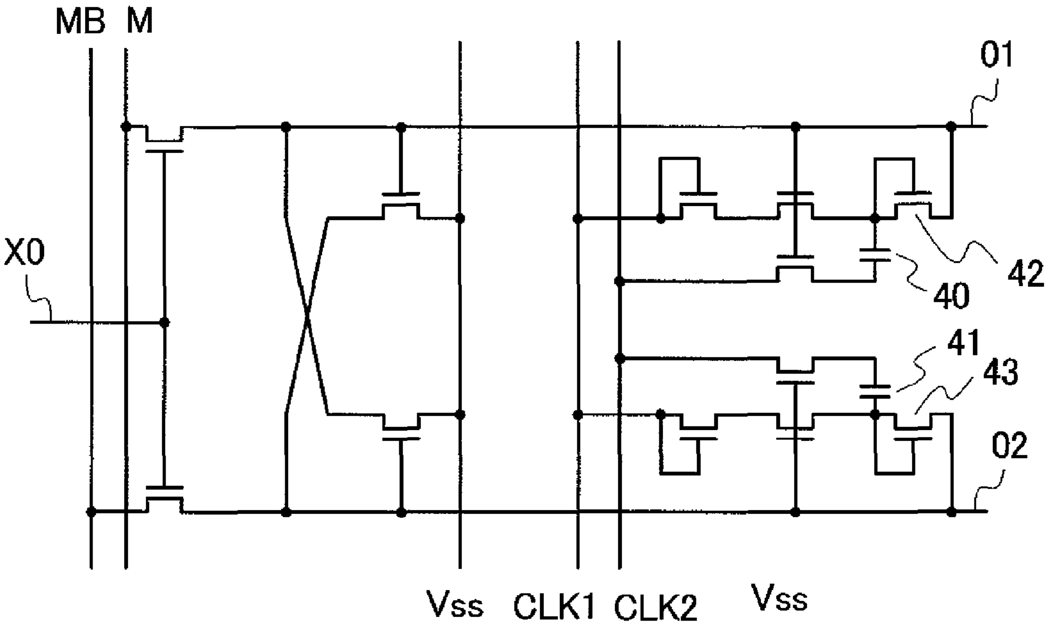
FIG. 7 is a circuit diagram showing another constitution of the counter electrode signal drive circuit.
Figure 8:
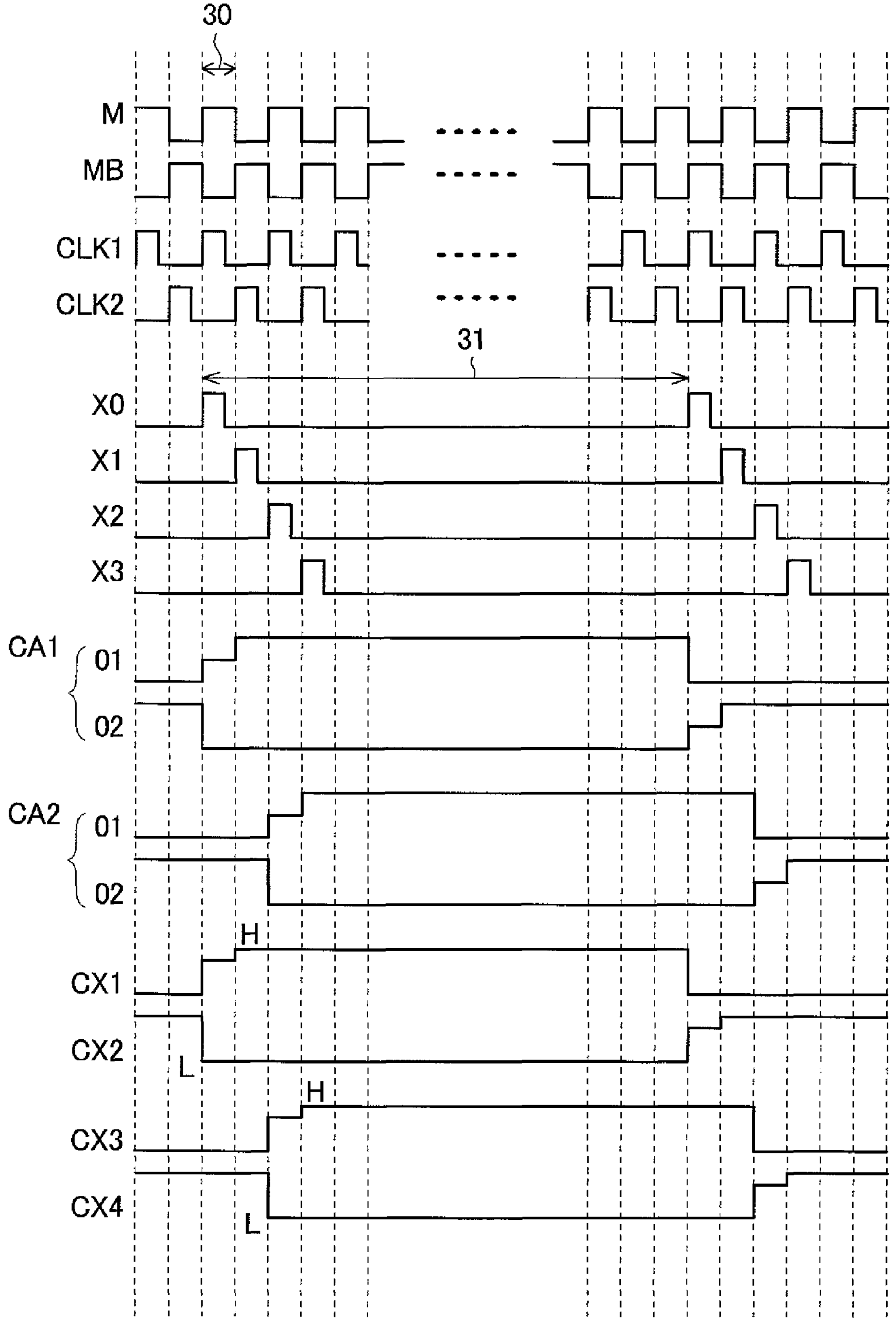
FIG. 8 is a timing chart for explaining an operation of the counter electrode signal drive circuit having another constitution.

FIG. 7 is a circuit diagram showing another constitution of the counter electrode signal drive circuit CA1. That is, FIG. 7 shows a constitutional example of the counter electrode signal drive circuit CA1 which adopts a charge pump method where a clock signals CLK1, CLK2 which are inputted to the scanning signal drive circuit 5 are used in the counter electrode signal drive circuit CA1. FIG. 8 is a timing chart used for the counter electrode signal drive circuit CA1 having the constitution shown in FIG. 7.

In the counter electrode signal drive circuit CA1 having such a constitution, when a first output signal line O1 or a second output signal line O2 is held at a high potential, a charge of a capacitance 40 or a capacitance 41 which is charged in response to the clock signal CLK1 is repeatedly outputted to the first output signal line O1 or the second output signal line O2 in response to the clock signal CLK2 via the transistor 42 or the transistor 43. Accordingly, a voltage which is applied to the first output signal line O1 and the voltage which is applied to the second output signal line O2 are repeatedly boosted thus stably holding the voltage during 1 frame at a high potential.

Figure 9:
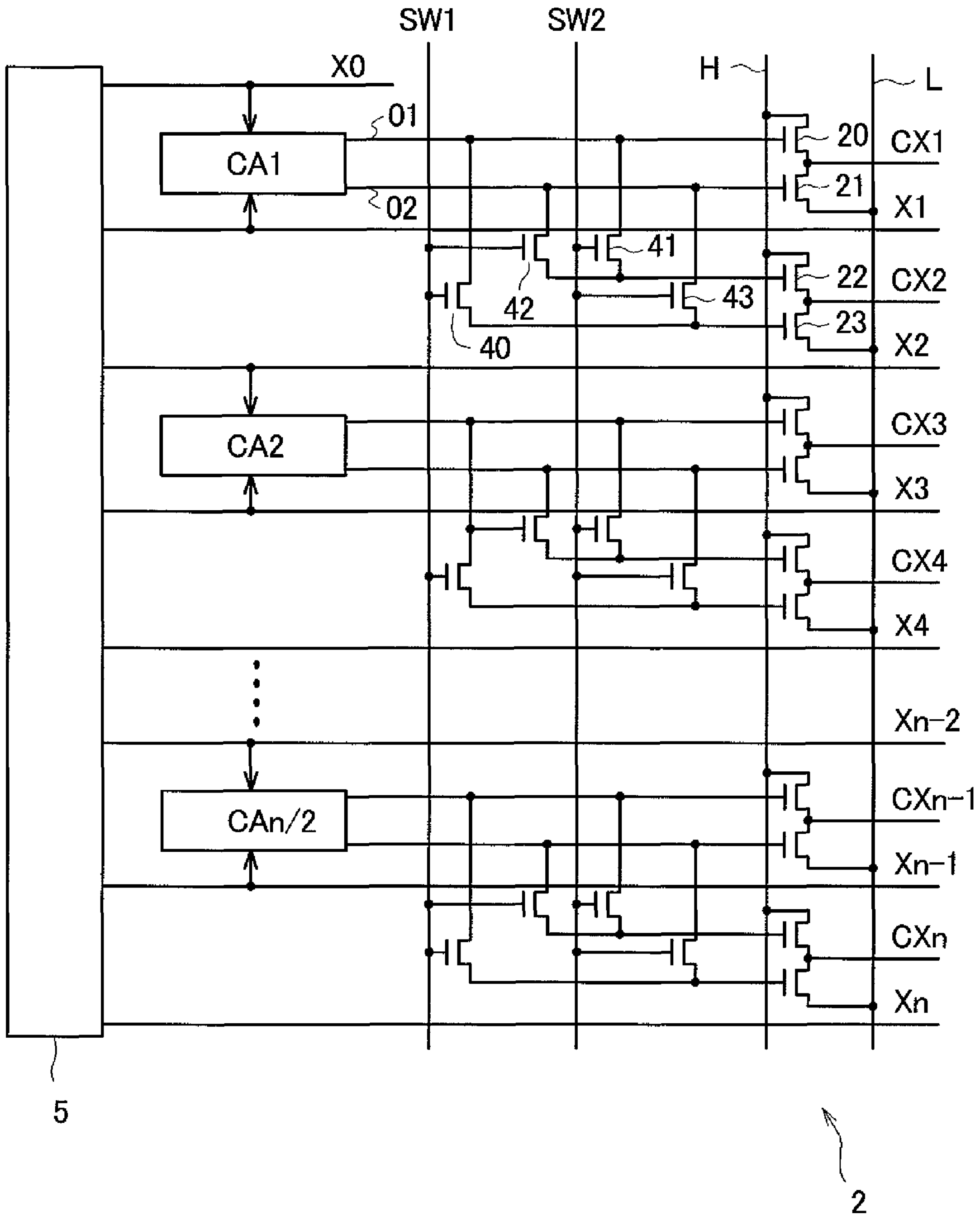
FIG. 9 is a circuit diagram showing the constitution of a vertical drive circuit according to a second embodiment of the present invention.

Next, a second preferred embodiment of the present invention is explained in conjunction with FIG. 9. This embodiment has the substantially equal constitution as the first embodiment except for the constitution of a connection portion which connects the counter electrode signal drive circuits CA1, CA2, . . . , CAn/2 and the counter electrode signal line portions CX1, CX2, . . . , CXn. Accordingly, the components which are common between these embodiments are given the same symbols and their detailed explanation is omitted.

FIG. 9 is a circuit diagram showing the structure of a vertical drive circuit 2 according to this embodiment. As shown in FIG. 9, in this embodiment, it is possible to change over a drive method of a liquid crystal display device between a line inversion method and a frame inversion method in response to switching signals from switch signal lines SW1, SW2.

The constitution of the vertical drive circuit 2 is explained in detail by taking a counter electrode signal drive circuit CA1 as an example. A first output signal line O1 is connected to a first transistor 20, and is also connected to a fourth transistor 23 via a transistor 40 and to a third transistor 22 via a transistor 41. A second output signal line O2 is connected to a second transistor 21, and is also connected to the third transistor 22 via a transistor 42 and to the fourth transistor 23 via a transistor 43. A gate of the transistor 40 and a gate of the transistor 42 are connected to the switch signal line SW1, while a gate of the transistor 41 and a gate of the transistor 43 are connected to the switch signal line SW2.

Here, in a first mode where the liquid crystal display device 1 is driven by the line inversion method, a switch signal having a high potential is applied to the switch signal line SW1 and a switch signal having a low potential is applied to the switch signal line SW2. In this case, the transistors 40, 42 are turned on, and the transistors 41, 43 are turned off so that an operation of a connection portion becomes completely equal to the operation of the connection portion in the first embodiment. That is, in a state that a first control signal is outputted for applying a high signal to the first output signal line O1 and a low signal to the second output signal line O2, a voltage having a high potential is supplied to the counter electrode signal line portion CX1 and a voltage having a low potential is supplied to the counter electrode signal line portion CX2. Further, in a state that a second control signal is outputted for applying a low signal to the first output signal line O1 and a high signal to the second output signal line O2, a voltage having a low potential is supplied to the counter electrode signal line portion CX1 and a voltage having a high potential is supplied to the counter electrode signal line portion CX2.

On the other hand, in a second mode where the liquid crystal display device 1 is driven by the frame inversion method, a switch signal having a low potential is applied to the switch signal line SW1 and a switch signal having a high potential is applied to the switch signal line SW2. In this case, the transistors 40, 42 are turned off, and the transistors 41, 43 are turned on so that the connection relationship of the first output signal line O1 and the second output signal line O2 with the counter electrode signal line portion CX2 becomes opposite to the corresponding connection relationship of the first output signal line O1 and the second output signal line O2 with the counter electrode signal line portion CX2 in the first embodiment. As a result, the same potential is always supplied to the counter electrode signal line portion CX1 and the counter electrode signal line portion CX2 and hence, eventually, the voltages which are applied to all counter electrode portions 12 during 1 frame have the same potential.

That is, the circuit constituted of the transistors 40 to 43 functions as a switch for changing over the drive mode of the liquid crystal display device 1 between the first mode and the second mode. The same goes for remaining counter electrode signal drive circuits CA2 to CAn/2.

Here, the switch signals which are applied to the switch signal lines SW1, SW2 may be changed over by a DIP switch arranged outside the circuit or a parameter which is held inside or outside the liquid crystal display device 1, for example. Further, the constitution of the switch for changing over the drive mode of the liquid crystal display device 1 between the first mode and the second mode is not limited to the constitution shown in the drawing. Provided that a circuit has the constitution which exhibits the same function as the circuit described above, any circuit may be used. For example, in this embodiment, although the counter electrode signal line portion CX2 is connected to the counter electrode signal drive circuit CA1 via the circuit which is constituted of the transistors 40 to 43, in place of such a constitution, the counter electrode signal line portion CX1 may be connected to the counter electrode signal drive circuit CA1 via the circuit which is constituted of the transistors 40 to 43. The number of switch signal lines is also not limited. That is, different from this embodiment where two switch signal lines are used, one switch line may be also used.

Figure 10:
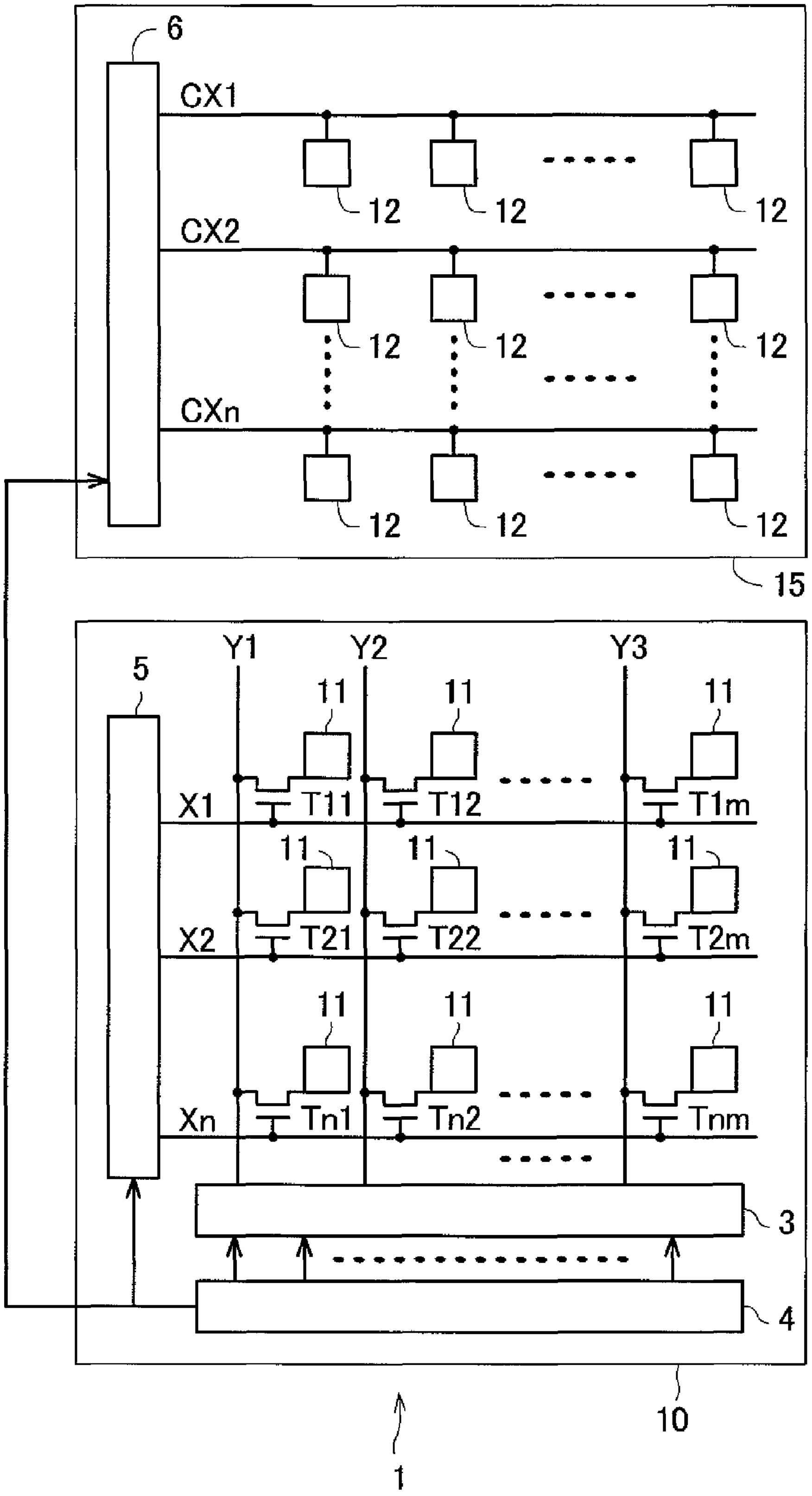
FIG. 10 is an overall circuit diagram showing a circuit arrangement of a liquid crystal display device according to a third embodiment.

FIG. 10 is an overall circuit diagram showing the circuit arrangement of a liquid crystal display device 1 according to a third preferred embodiment of the present invention. In this embodiment, the constitution of the liquid crystal display device 1 is substantially equal to the constitution of the liquid crystal display device 1 of the first embodiment except for a point that the liquid crystal display device 1 is a vertical-electric-field-type liquid crystal display device such as a VA-type or a TN-type liquid crystal display device. Accordingly, components which are common between the embodiments are given the same symbols and their detailed explanation is omitted.

In the vertical-electric-field-type liquid crystal display device 1, counter electrode portions 12 are formed on a color filter substrate 15. Accordingly, on a TFT substrate 10, a scanning signal drive circuit 5 which is formed by removing the counter electrode signal drive circuits CA1 to CAn from the vertical drive circuit 2 of the first embodiment is mounted. Further, a group of counter-electrode-signal drive circuits 6 consisting of the counter electrode signal drive circuits CA1 to CAn, counter electrode signal line portions CX1 to CXn and counter electrode portions 12 are formed on the color filter substrate 15. When the liquid crystal display device 1 is assembled, pixel electrodes 11 formed on the TFT substrate 10 and the counter electrode portions 12 formed on the color filter substrate 15 are arranged to face each other in an opposed manner while interposing a liquid crystal layer 14 therebetween thus forming holding capacitances C11 to Cnm. Further, various kinds of control signals are outputted to the group of counter electrode signal drive circuits 6 from a driver circuit 4.

Due to such a constitution, also in the vertical-electric-field-type liquid crystal display device 1, a circuit scale can be reduced in the same manner as the first embodiment. Further, the scanning signal drive circuit 5 of the first embodiment is divided and the divided circuits are separately arranged on the different substrates. Accordingly, in a state where the liquid crystal display device 1 is assembled, it is possible to arrange the scanning signal drive circuit 5 and the group of the counter electrode signal drive circuits 6 at a position where the scanning signal drive circuit 5 and the group of counter electrode signal drive circuits 6 overlap with each other thus further reducing an area which the circuits occupy in the liquid crystal display device 1.

What is claimed is:

1. A liquid crystal display device comprising:
a substrate;
a plurality of counter electrode portions which are formed on the substrate corresponding to pixels and function as counter electrodes;
a plurality of counter electrode signal lines which are formed on the substrate, are electrically made conductive with the counter electrode portions, extend in a first direction, and are arranged parallel to each other in a second direction which intersects the first direction; and
control signal circuits which output control signals for controlling voltages applied to the counter electrode signal lines;
wherein the control signal circuits are formed on the substrate at a rate of one control signal circuit for two counter electrode signal lines;
wherein a first voltage value is outputted to a first counter electrode signal line in response to a first control signal from the control signal circuit and a second voltage value is outputted to the first counter electrode signal line in response to a second control signal from the control signal circuit; and
wherein the second voltage value is outputted to a second counter electrode signal line in response to the first control signal from the control signal circuit and the first voltage value is outputted to the second counter electrode signal line in response to the second control signal from the control signal circuit.

2. A liquid crystal display device according to claim 1, wherein the control signal circuit outputs the control signal in response to a scanning signal inputted from a scanning signal line.

3. A liquid crystal display device according to claim 1, wherein the control signal circuit outputs the control signal in response to a clock signal inputted from a clock signal line.

4. A liquid crystal display device comprising:
a substrate;
a plurality of counter electrode portions which are formed on the substrate corresponding to pixels and function as counter electrodes;
a plurality of counter electrode signal lines which are formed on the substrate, are electrically made conductive with the counter electrode portions, extend in a first direction, and are arranged parallel to each other in a second direction which intersects the first direction; and control signal circuits which output control signals for controlling voltages applied to the counter electrode signal lines;

wherein the control signal circuits are formed on the substrate at a rate of one control signal circuit for two counter electrode signal lines;

wherein the first counter electrode signal line is connected to a first voltage line via a first transistor and is connected to a second voltage line via a second transistor;

wherein the second counter electrode signal line is connected to the first voltage line via a third transistor and is connected to the second voltage line via a fourth transistor;

wherein a first control signal line which extends from the control signal circuit is connected to the first transistor and the fourth transistor; and wherein a second control signal line which extends from the control signal circuit is connected to the second transistor and the third transistor.

5. A liquid crystal display device according to claim 4, wherein the control signal circuit outputs the control signal in response to a scanning signal inputted from a scanning signal line.

6. A liquid crystal display device according to claim 4, wherein the control signal circuit outputs the control signal in response to a clock signal inputted from a clock signal line.

7. A liquid crystal display device comprising:

a substrate;

a plurality of counter electrode portions which are formed on the substrate corresponding to pixels and function as counter electrodes;

a plurality of counter electrode signal lines which are formed on the substrate, are electrically made conductive with the counter electrode portions, extend in a first direction, and are arranged parallel to each other in a second direction which intersects the first direction;

control signal circuits which output control signals for controlling voltages applied to the counter electrode signal lines;

wherein the control signal circuits are formed on the substrate at a rate of one control signal circuit for two counter electrode signal lines; and a switch which changes over an operation mode between a first mode in which a second voltage value is outputted to a second counter electrode signal line in response to a first control signal from the control signal circuit and a first voltage value is outputted to the second counter electrode signal line in response to the second control signal from the control signal circuit, and a second mode in which the first voltage value is outputted to the second counter electrode signal line in response to the first control signal from the control signal circuit and the second voltage value is outputted to the second counter electrode signal line in response to the second control signal from the control signal circuit.

8. A liquid crystal display device according to claim 7, wherein the control signal circuit outputs the control signal in response to a scanning signal inputted from a scanning signal line.

9. A liquid crystal display device according to claim 7, wherein the control signal circuit outputs the control signal in response to a clock signal inputted from a clock signal line.

* * * * *